J. C. & G. Shackleton,
Steam Trap.

No. 46,825. Patented Mar. 14, 1865.

Witnesses.
C. L. Topliff
M. M. Livingston

Inventor
J. C. & G. Shackleton
per Munn & Co.
Attys

UNITED STATES PATENT OFFICE.

JOHN C. SHACKLETON AND GEORGE SHACKLETON, OF LAWRENCE, MASS.

IMPROVEMENT IN STEAM-TRAPS.

Specification forming part of Letters Patent No. 46,825, dated March 14, 1865.

*To all whom it may concern:*

Be it known that we, JOHN C. SHACKLETON and GEORGE SHACKLETON, of Lawrence, in the county of Essex and State of Massachusetts, have invented a new and useful Improvement in Steam-Traps; and we do hereby declare that the following is a full, clear, and exact description thereof, which will enable those skilled in the art to make and use the same, reference being had to the accompanying drawings, forming part of this specification, in which—

Figure 1:
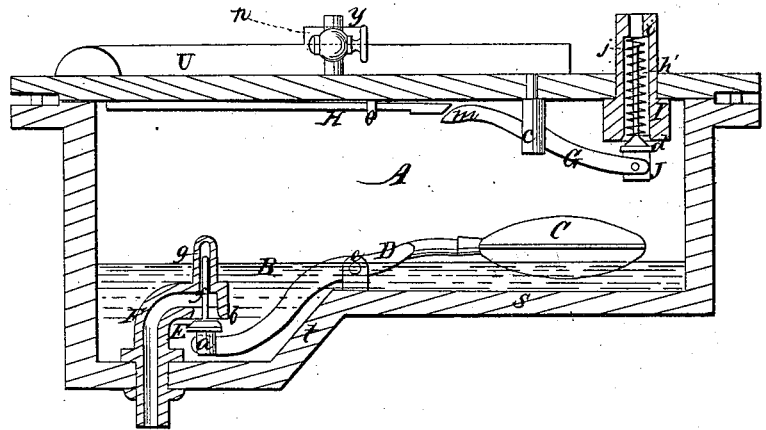
Figure 2:
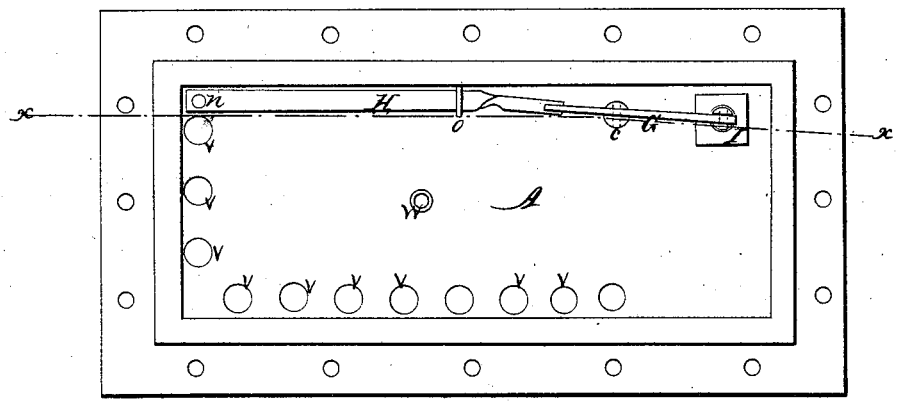
Figure 3:
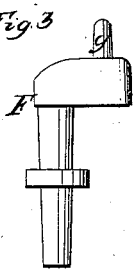

Figure 1 is a longitudinal section of our steam-trap, taken on the line $x$ of Fig. 2. Fig. 2 is an under side view of the cover of the trap. Fig. 3 is a separate view of the water-discharge pipe.

Similar letters of reference indicate corresponding parts.

This improvement in steam-traps consists in part in the box in which the water-discharge valve is placed, the arrangement being such as to keep that valve always under water.

A represents an iron box, which contains the different parts of the trap, its sides and top being plain unbroken surfaces, and its bottom S being depressed at one end by the height of the inclined plane $t$, which separates the lower from the higher part of the bottom of the box. F is a water-discharge pipe, passing through the lower part of the bottom of the box and bent forward within the box at a right angle, as seen in the drawings, its forward end being surmounted by a small tube, $g$, closed at top but opening into the interior of the pipe, and a valve-seat, $b$, being formed on the under side of the horizontal portion of the pipe directly beneath the tube $g$. The valve-seat $b$ has a valve, E, fitted to it, from the center of which rises a valve-stem, $f$, which passes upward through the valve-opening into the tube $g$, thereby guiding the valve E in its movements toward and from the valve-seat. D is a lever, which is jointed by a pivot at $a$ to the lower side of the valve E, from whence it curves upward above the inclined side $t$, past a standard, $e$, to which it is pivoted to a float, C, of oblate form, resembling very nearly the shape of a watch-case. When the water of condensation accumulates in the box A, the float C will be raised, carrying with it the arm D, which, turning upon the pivot in the standard $e$, depresses and opens the valve E, and the water will escape through the pipe F until the float rests upon the bottom of the box, at which time the valve will be closed by the weight of the float, the valve being still immersed in and covered by the water left in the lower part of the box, the depth of the depression and the height of the pipe being adjusted so as to keep the valve E always under water.

I is an open pipe, fixed in the top of the box A near one end thereof, through which air is allowed to escape from the trap. A shoulder, $i$, is made within the pipe $i'$, the said pipe being enlarged in diameter below the shoulder to receive a spiral spring, $j$, whose upper end bears against it, and whose lower end rests upon a pin or collar formed on a valve-spindle, $b'$, which projects upward within the coils of the spring, the valve J, from the axis of which the spindle $b'$ rises, being fitted to the valve-seat $d$ at the lower end of the pipe I.

G is a valve-rod, pivoted at one end to the lower side of the valve J, and extending thence beneath the top of the box past a hanger, $c$, to which it is pivoted nearly at the center of its length, and in such a position as that its free end $m$, which is curved downward shall be a little below the top of the box. H is a copper bar, one end of which is fastened at $n$ to that end of the box which is opposite to the pipe I, and extending through a guide, $o$, so as to rest upon the curved face $m$ of the valve-rod G.

U represents a pipe, closed at its ends, which is laid upon or forms parts of the cover of the box. Connection is made between it and the steam pipes or apparatus which are to be cleared of the water of condensation by means of a branch pipe, $n$. The pipe U communicates throughout its length with the interior of the box by means of numerous perforations V, which are made through the cover of the box and also through the lower side of the pipe. The object of these perforations is to distribute the water of condensation and the steam on entering the trap so that the pressure shall not come upon one place.

The operation of the apparatus is as follows: When the steam is shut off, the copper rod H will contract in consequence of the fall in temperature which will ensue, and the lever G will be left free to vibrate on its pivot and open the valve J, yielding to the pressure of the spring $j$. The opening of the valve J establishes free communication with the atmosphere. When the pipe U is again put in communication with the steam apparatus, the water of condensation and the steam which make their way into the trap will heat the copper bar H, whose consequent expansion will cause the valve J to become closed. The accumulation of water in the box at last raises the float C off the bottom of the box, and thereby opens the water-discharge valve, through which the water escapes until the float falls to so low a position as to close the valve.

W is an opening made in the top of the box A, to which we fit a try-cock, Y, whose office is to enable us to ascertain if the steam in the box is dry.

We claim as new and desire to secure by Letters Patent—

1. The bottom of steam-traps of unequal height, so as to admit of a well at one end and a water-discharge valve therein, so that the said valve shall remain immersed in the water of condensation while it is closed, substantially as described.

2. The combination and arrangement of the air-valve in the trap with the rod H and spring $j$, and causing the same to be operated by the expansion of the rod H and by the spring $j$, substantially as above described.

3. The arrangement of the water-discharge pipe F, in combination with the guide-tube $g$, for guiding the valve E and the float C, substantially as above described.

4. The arrangement of the water-discharge valve below the place of the float, substantially as above described.

JOHN C. SHACKLETON.
GEORGE SHACKLETON.

Witnesses:
SAML. P. ANDRUS,
JOHN WINSON.